United States Patent Office 3,434,846
Patented Mar. 25, 1969

3,434,846
EDIBLE PROPYLENE GLYCOL SOLID
Charles R. Scott, Midland, Mich., assignor to The Dow Chemical Company, Midland, Mich., a corporation of Delaware
No Drawing. Filed Dec. 3, 1965, Ser. No. 511,323
Int. Cl. A23c 9/10
U.S. Cl. 99—56
1 Claim

ABSTRACT OF THE DISCLOSURE

Propylene glycol and a water-dispersible, dry, proteinaceous solid are mixed together; the glycol is from 40 to 80 weight percent by weight of total product; the edible product is "solid" in the sense of difficulty deformable plastic materials.

---

The present invention is concerned with an essentially solid composition of an edible glycol, and is particularly directed to a solid substance having physical properties suitable for eating, and a content of propylene glycol as high as is compatible with a solid form, whereby the propylene glycol can be employed as essentially a solid, other substances present being edible and unobjectionable.

According to the present invention, there is obtained a solid which is edible and unobjectionable when propylene glycol and a water-dispersible dry proteinaceous solid is mixed together in a ratio that varies with the employed proteinaceous material but typically, from 40 to 80 percent propylene glycol by weight, the balance being proteinaceous solids.

The employed propylene glycol may be of any degree of purity, but when it is desired that the resulting solid be safely ingestible, the propylene glycol should be of an ingestible grade of purity.

The employed proteinaceous solids need be no more free of water than air dry, and can be solids derived from milk by the removal of water and minor other volatile substances from whole milk, skimmed milk, buttermilk, light cream, or cream of any butterfat content from which it is reasonable to remove water to obtain a dry solid. Typically, cow's milk will most commonly be used. The presence of the fats and sugars seems unobjectionable. In the absence of other controlling factors, costs and efficiency in the present invention considered, skimmed milk solids are preferred. The water dispersible proteinaceous solids include also water extracted soybean protein fractions, albumin, and gelatin.

Description herein of a proteinaceous material as being "water dispersible" is intended to mean that, when mixed with water at ordinary temperatures such as room temperature, the protein can be wetted and, with or without heating, can be dispersed uniformly in water. It is understood that proteins susceptible of heat denaturation should not be heated to the point of undergoing such denaturation.

Such proteins are often referred to as "water soluble": whether any protein is truly soluble depends upon the definition of solution. However, when a protein is appropriately described as "water soluble," without exhausting the fine point of definition, it can be used in the present invention. The present invention does not dissolve it in water.

The solid of the present invention is easily prepared by combining, at room temperature and with mixing and stirring, the propylene glycol and the air-dry, water dispersible protein, in any concentration within the indicated limits of the range to be employed. Mixing can be carried out by hand in a vessel employing a stirring rod, in a high-speed impeller type electric blender, or in commercial or industrial food mixing equipment of standard sorts.

For purposes of the present invention, a product of the present invention is defined as a solid when, upon being prepared and disposed in a petri dish that is ½ inch deep, the product therein being of a depth of about ⅜ inch, being permitted to stand for 1 hour and then elevated at one edge to an angle of 45° to horizontal, it does not, within one minute, flow to the extent that any of the substance escapes the petri dish. In the testing of substances leading to the making of the present invention it has been observed that most substances tend to form either well defined solids or, failing, are well defined fluids.

The glycol-protein compositions of the present invention can, of course, be modified in various known ways. The propylene glycol can be used as a carrier for a flavoring substance combined with the glycol before or after the preparation of the present product. Sugar or other sweetening or appetitive agents can be added. Also, thickening or bulking agents can be employed such as methyl cellulose, starch, the sodium salt of carboxymethyl cellulose, pectin, and any of a variety of other known hydrocolloid thickening agents. Also, coloring agents and, if desired, medicaments, can be mixed with the composition of the present invention to employ the composition as a vehicle.

Although the exterior surface of a solid of the present invention tends to be adhesive, it is no more so than many candies, and it can readily be coated in known manner with known coating agents such as, for example, confectioners' milk chocolate or other confectionery coating consisting essentially of sugar, fat, optionally emulsifier such as lecethin, coloring, and flavoring substances. Also, if desired, the composition can be encased in edible or inedible casings such as are employed with sausages; or in cookie or cake dough. Also, although the present substance does not flow spontaneously, it is deformable and can be disposed in a collapsible tube such as a metal or plastic tube having a removable cap and an opening from which to express contents.

Persons skilled in the art will be able to practice the present invention from the foregoing. The present examples set forth the best method now known to the inventor of practicing this invention.

EXAMPLE 1

8 grams propylene glycol are disposed in a 50 milliliter beaker. Thereto are added 2 grams commercial non-fat dry milk solids. The milk solids are mixed and stirred into the propylene glycol carefully and thoroughly using a stirring rod, and carefully breaking up particles of dry milk solids and dispersing them in the glycol to obtain as nearly as possible a homogeneous mixture. As the mixing proceeds, the resulting mixture increases in viscosity and, by the time the mixing is apparently essentially complete, a quite viscous pasty substance has been obtained. A layer approximately ⅜ inch deep of this material is disposed in a petri dish ½ inch deep and set aside for one hour. At the end of this time, it is tested for solidity by elevating one edge of the petri dish to an angle of 45° from horizontal. At the end of one minute, none of the resulting product has flowed out of the petri dish. In fact, the material remains essentially undeformed. To the touch, the solid substance is readily deformable but tends to hold surface features given to it.

EXAMPLE 2

Essentially the procedures of Example 1 were repeated, employing 7 grams propylene glycol and 3 grams milk solids. As a result of this procedure there was obtained a substance meeting the present definition of a solid, and of somewhat greater viscosity and heavier body than the product of Example 1.

EXAMPLE 3

In procedures essentially the same as the foregoing, other compositions of the present invention are prepared employing, respectively, 6 grams propylene glycol and 4 grams milk solids, 5 grams propylene glycol and 5 grams milk solids, and 4 grams propylene glycol and 6 grams milk solids. As a result of these procedures there are obtained, in each case, products which meet the present definition of solid.

When more than 60 percent of the entire mixture is milk solid substances, the product of the present invention is apparently formed, but it appears to lose its identity by being mixed with an excess of the dried milk.

EXAMPLE 4

A composition was prepared comprising, all parts by weight, 71 percent propylene glycol, 4.77 percent methyl cellulose, and 24.1 percent milk solids. The methyl cellulose and milk solids were dispersed, with stirring, in the propylene glycol. As a result of these operations there was obtained a solid which was substantially firmer than a corresponding solid made without the methyl cellulose.

EXAMPLE 5

Essentially the procedures of Example 4 foregoing, were repeated, employing 71 percent propylene glycol, 0.06 percent methyl cellulose, and 28.4 percent dry non-fat milk solids. As a result of these procedures there was obtained a firm apparently solid product.

EXAMPLE 6

To ascertain the effect of water on a mixture of glycol and milk solids, there was prepared a composition containing, all proportions by weight, 50 percent milk solids, 20 percent propylene glycol and 30 percent water. The resulting mixture was a good, firm substance meeting the present definition of a solid.

EXAMPLE 7

In the present example, 60 percent propylene glycol was combined with 30 percent non-fat milk solids and 10 percent water. The ingredients were thoroughly mixed and stirred together to obtain an essentially homogeneous composition. As a result of these procedures there was obtained a substance meeting the present definition of solid.

EXAMPLE 8

In essentially the manner of Example 1, foregoing, the product of the present invention was prepared by combining propylene glycol and egg albumin. The relative proportions of the two substances were essentially the same as those which gave solid products when milk solids and propylene glycol were combined. The resulting egg albumin-glycol solids were sufficiently firm and free from quick syneresis to be satisfactory for food use.

Essentially the same results are obtained when employing blood albumin and albumin from sources other than egg.

EXAMPLE 9

A commercial gelatin is wetted with cool propylene glycol, and thereafter dispersed with warming in propylene glycol in various samples representing essentially the range of concentrations hereinbefore described in the products prepared from milk solids and propylene glycol. Upon cooling, the resulting products are solids according to the definition herein employed.

EXAMPLE 10

Various water-dispersible soy bean protein fractions were employed in the manner of Example 1, and it was ascertained that these substances also in some way combined with propylene glycol to obtain products which met the present definition of solids. Approximately the same range of concentrations was represented as was used in employing dry milk solids.

In contrast with the foregoing, water-insoluble soy bean derivatives formed no solids, peanut butter did not form a solid, finely subdivided freeze-dried beef and pork, employed separately, formed no solids; cotton seed meal did not form a solid and various other proteinaceous substances not characterized by being water-dispersible also failed to form the solid products of the present invention.

Also, lower alkanols and lower alkanetriols do not form solids of the present invention.

I claim:

1. Composition behaving practically as a solid consisting essentially of propylene glycol in intimate combination with water-dispersible proteinaceous air-dry milk solids wherein the propylene glycol represents from 40 to 80 percent, by weight, of the total composition.

References Cited

UNITED STATES PATENTS 3,243,347  3/1966  Kracauer _____ 99—56 X

LIONEL M. SHAPIRO, *Primary Examiner.*

D. M. NAFF, *Assistant Examiner.*

U.S. Cl. X.R.

99—14, 20, 54